(12) United States Patent
Miyachi et al.

(10) Patent No.: US 6,211,937 B1
(45) Date of Patent: Apr. 3, 2001

(54) LIQUID CRYSTAL DISPLAY DEVICE INCLUDING SPACERS LOCATED IN POSITIONS INDICATIVE OF RUBBING/ORIENTATION DIRECTION

(75) Inventors: Kouichi Miyachi, Tenri; Sunao Aoki, Yamatotakada, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/166,148

(22) Filed: Oct. 5, 1998

(30) Foreign Application Priority Data

Oct. 6, 1997 (JP) .................................................. 9-272425
Jul. 21, 1998 (JP) ................................................ 10-204139

(51) Int. Cl.⁷ ........................... G02F 1/141; G02F 1/1339
(52) U.S. Cl. .......................... 349/156; 349/126; 349/155
(58) Field of Search .................................. 349/155, 156, 349/126, 153, 43

(56) References Cited

U.S. PATENT DOCUMENTS 5,726,728 * 3/1998 Kondo et al. .......................... 349/156
5,917,572 * 6/1999 Kurauchi et al. ..................... 349/156
5,995,190 * 11/1999 Nagae et al. .......................... 349/156

FOREIGN PATENT DOCUMENTS 6-175133   6/1994  (JP) .
9-73088    3/1997  (JP) .

* cited by examiner

*Primary Examiner*—William L. Sikes
*Assistant Examiner*—Toan Ton
(74) *Attorney, Agent, or Firm*—Nixon & Vanderhye P.C.

(57) ABSTRACT

An object of the present invention is to regulate the thickness of a liquid crystal layer between faces of substrates more uniformly and accurately than the prior arts, to eliminate an orientation disturbance caused in a rubbing treatment and to prevent a display performance from degraded, by introducing columnar spacers which have a firm adhesion force to an active matrix substrate. On an active matrix substrate which has switching elements arranged in a matrix form and pixel electrodes, columnar spacers are formed in vicinities of the switching elements on gate lines or source lines connected to the switching elements, or formed on the switching elements. Further, for giving a rubbing process to a resin film for an orientation film which is formed on the active matrix substrate, a rubbing direction is set to be a direction where an orientation-disturbed region formed in the rear of the columnar spacers does not overlap the pixel electrode substantially.

12 Claims, 13 Drawing Sheets

LIQUID CRYSTAL DISPLAY DEVICE INCLUDING SPACERS LOCATED IN POSITIONS INDICATIVE OF RUBBING/ORIENTATION DIRECTION

BACKGROUND OF THE INVENTION

1. Field of the Invention

The present invention relates to a liquid crystal display device provided with a TFT (thin film transistor) or the like as a switching element, and to a method for manufacturing the same.

2. Description of the Related Art

At present, a liquid crystal display device generally has a structure that two glass substrates having a transparent electrode face to each other and liquid crystal is sandwiched between the two substrates. In order to keep a distance between the two substrates constant, spacers of uniform particle diameter such as plastic beads are scattered between the substrates.

This structure has such a general problem that, when orientation of the liquid crystal molecules around the spacers scattered between the two substrates is disturbed, light leaks from peripheries of the spacers where the orientation is disturbed, and accordingly the contrast tends to be degraded.

Further, it is difficult to uniformly scatter the spacers between the substrates. In addition, irregularities due to lines, switching elements, color filters and so on between the substrates make the sealed-in liquid crystal layer nonuniform in thickness, depending on arrangement positions of the spacers, which causes display degradation and reduction in yield of product.

As measure for such problems, it is proposed to form columnar spacers by using a photoresist or the like.

However, in the case where a resin for an orientation film is applied after formation of the columnar spacers, and rubbing treatment is conducted in which the resin film for an orientation film is rubbed with a rubbing cloth to form a lot of fine grooves on the resin film for an orientation film along one direction, there arises a problem that part of the resin film is not rubbed due to protrusions of the spacers and the part becomes an orientation-disturbed region, which degrades a display quality. In addition, the columnar spacers are dropped from the substrates due to the rubbing treatment.

To solve these problems, the following methods are disclosed in Japanese Unexamined Patent Publications JP-A 9-73088 (1997) and JP-A 6-175133 (1994).

As to the orientation disturbance traced in the protrusions of the spacers as mentioned above, such a method is disclosed in both the publications that spacers are placed at positions where orientation-disturbed regions starting at spacers do not extend to pixels so that an orientation failure occurs only in portions which have no direct bearing on the display quality, using lines and light shielding regions on the substrates.

In addition, JP-A 9-73088 discloses a method that in order to reduce the resistance sustained by pile of the rubbing cloth and decrease the orientation failure, the spacers are made to have a vertex at a part coming into contact with the rubbing cloth, a smooth taper shape, and a cross-sectional shape of an ellipse, triangle, rhombus or the like.

Furthermore, JP-A 9-73088 discloses a method that in order to solve the problem that the spacers are dropped from the substrates, the shape of the spacers is made to be an elliptic cylinder and the longitudinal direction of the elliptic cylinder is made to be parallel to a rubbing direction, whereby a mechanical strength of the spacers is maintained while a load on the spacers is minimized.

However, since adhesion strength of the spacers to the substrate is not taken into consideration in any method disclosed in the two publications, the spacers may be dropped due to a pressure of the pile in the rubbing treatment.

Particularly, the method of JP-A 9-73088 has a problem that the spacers are disposed on a light-shielding layer made of a black resin, so that the adhesion strength of the spacers to the light-shielding layer is extremely low and hence the spacers are easily dropped from substrates in the rubbing treatment. This is because an upper surface of the light-shielding layer made of a black resin is usually flat and hence the adhesion strength of the spacers thereto is low. Further, although it is designed that the spacers have a smooth shape so as to minimize a load from the rubbing cloth to the spacers, the adhesion strength of the spacers to the substrate face is not enhanced, and therefore the problems are not essentially solved. Furthermore, in order to make the spacers have a sectional shape of an ellipse, triangle, rhombus or the like, precise and complicated operations of photolithography, etching process and so on are required, so that there are problems of increase in cost and reduction in yield.

On the other hand, in JP-A 6-175133 the spacers are formed on uneven regions which are between the pixels or on the switching element to obtain a wide adhesion area for the purpose of enhanced adhesion strength, however, the spacers are formed on the orientation film with the result that a remarkable improvement of the adhesion strength cannot be achieved. Moreover, since the rubbing treatment is conducted after the formation of spacers, there remains the problem that the spacers are dropped from the substrates due to the pressure of the rubbing cloth. Further, since the surface of the orientation film is exposed to a chemical for forming spacers in a spacer forming process, such a serious problem arises that a force for regulating the orientation of liquid crystal molecules is reduced, the display quality is degraded due to a printed after-image and so on. Additionally since the art of JP-A 6-175133 takes no measure in connection with the shape of the spacers, an orientation failure which accompanies a rubbing failure cannot be avoided.

SUMMARY OF THE INVENTION

An object of the present invention is to regulate the thickness of a liquid crystal layer between faces of substrates more uniformly and accurately than the prior art, to eliminate an orientation disturbance caused in a rubbing treatment and to prevent degradation of display quality, by introducing columnar spacers which have a firm adhesion force to an active matrix substrate and which can be manufactured in a simple manner.

In a first aspect of the invention, there is provided a liquid crystal display device comprising a liquid crystal layer, and an active matrix substrate and a counter substrate for interposing the liquid crystal layer therebetween, the active matrix substrate having at least switching elements and pixel electrodes arranged in a matrix form, the liquid crystal display device further comprising columnar spacers for regulating a space between the substrates, which spacers are adhered onto portions of a liquid-crystal-layer-side surface of the active matrix substrate, the portions having irregularities and a nearly tapered cross-section, wherein the columnar spacers have a taper angle in accordance with the taper shape of the liquid-crystal-layer-side surface of the active matrix substrate.

In a second aspect of the invention, the active matrix substrate further has lines connected to the switching elements, on the liquid-crystal-layer side; and the columnar spacers are disposed on the lines in vicinities of the switching elements.

In a third aspect of the invention, the columnar spacers are disposed on the switching elements.

According to the invention, the lines have a convex-shaped section or a concave-shaped section due to the presence of a pattern-removed portion within a pixel, in either case, often have a tapered section. Therefore, they have an adhesion area larger than the cross-sectional area of the columnar spacers so that the columnar spacers are not easily disconnected from the substrates in the rubbing treatment, and the taper of the columnar spacers formed at the convex or concave portion is likely to become smooth by reflecting the taper of the base shape, whereby the orientation disturbance due to the rubbing treatment is decreased. Further, in a case where the columnar spacers are formed on the switching elements, the switching elements have a comparatively complicated irregularity, it is possible to increase the adhesion strength and obtain a gentle cone angle as well as in the above case. Furthermore, formation of the columnar spacers is limited at positions of a designated height, so that the thickness of the liquid crystal layer is accurately regulated.

In a fourth aspect of the invention, the liquid crystal display device further comprises an orientation film which is formed on a liquid-crystal-layer-side surface of the active matrix substrate, and subjected to a rubbing treatment along a direction from the columnar spacer toward the switching element.

In a fifth aspect of the invention, the rubbing direction is selected so that orientation-disturbed regions do not substantially overlap the pixel electrodes, which regions are formed in vicinities of the columnar spacers on the orientation film, in a direction from the columnar spacers toward the rubbing direction.

According to the invention, the orientation-disturbed regions formed in the rear of the columnar spacers on the orientation film, do not substantially overlap the pixel electrodes, so that the orientation-disturbed region do not affect the display quality of the liquid crystal display device at all, and a high-quality display can be attained.

In a sixth aspect of the invention, the liquid crystal display device further comprises an adhesion layer for adhering vertexes of the columnar spacers to the counter substrate.

According to the invention, the vertexes of the columnar spacers are adhered to the counter substrate via an adhesive, so that the active matrix substrate is firmly adhered to the counter substrate. Therefore, the liquid crystal layer becomes uniform in thickness, display unevenness is eliminated, and the display quality is improved.

In a seventh aspect of the invention, the liquid crystal display device further comprises a seal portion for bonding the active matrix substrate and the counter electrode together at a perimeter of the substrates, wherein the columnar spacers are disposed on the active matrix substrate facing the seal portion.

According to the invention, the columnar spacers are formed on the active matrix substrate even at a portion corresponding to the seal portion of the perimeter, and the active matrix substrate and the counter substrate are bonded together via this seal portion of the perimeter, which seal portion incorporates the columnar spacers, so that the thickness of the liquid crystal layer becomes further uniform, the display unevenness is eliminated, and the display quality is further improved.

In an eighth aspect of the invention, there is provided a method for manufacturing a liquid crystal display device comprising a liquid crystal layer, and an active matrix substrate and a counter substrate for interposing the liquid crystal layer therebetween, the active matrix substrate having at least switching elements arranged in a matrix form, lines connected to the switching elements, and pixel electrodes, the method comprising the steps of:

applying a photoresist resin to a liquid-crystal-layer-side surface of the active matrix substrate, exposing, developing, and baking irregularity faces which are faces of the photoresist resin on the switching elements or on the lines, and patterning to form columnar spacers; and applying a resin to become an orientation film, to the liquid-crystal-layer-side face of the active matrix substrate where the spacers are formed, and thereafter conducting a rubbing treatment to the resin film in a rubbing direction so that orientation-disturbed regions do not substantially overlap the pixel electrodes, which regions are formed in vicinities of the columnar spacers.

In a ninth aspect of the invention, the method for manufacturing a liquid crystal display device further comprises after the step of rubbing treatment the steps of:

applying an adhesive to vertexes of the columnar spacers; and adhering the active matrix substrate to the counter substrate at a perimeter of the substrates, while adhering the vertexes of the columnar spacers to the counter substrate via the applied adhesive, so as to form a seal portion.

In a tenth aspect of the invention, the irregularity faces which are faces of the photoresist resin film on the perimeter of the substrates, are also exposed to form the columnar spacers at the step of forming the columnar spacers, and the method further comprises after the step of rubbing treatment the step of adhering the active matrix substrate to the counter substrate at the perimeter of the substrates interposing the columnar spacers therebetween to form the seal portion.

According to the invention, it is possible to provide the methods for manufacturing a liquid crystal display device as mentioned above.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1A:
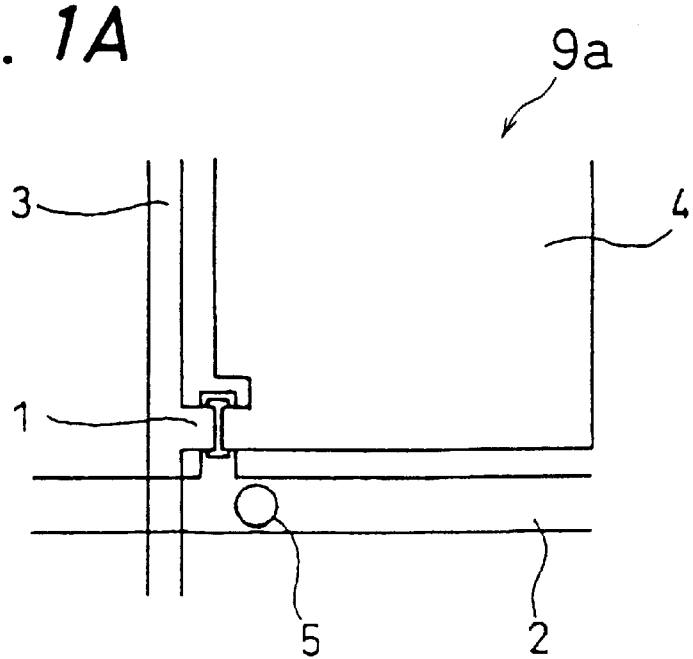
FIGS. 1A and 1B are plan views showing a liquid crystal display device 9a of a first embodiment of the invention.

Now referring to the drawings, preferred embodiments of the invention are described below.

Figure 1B:
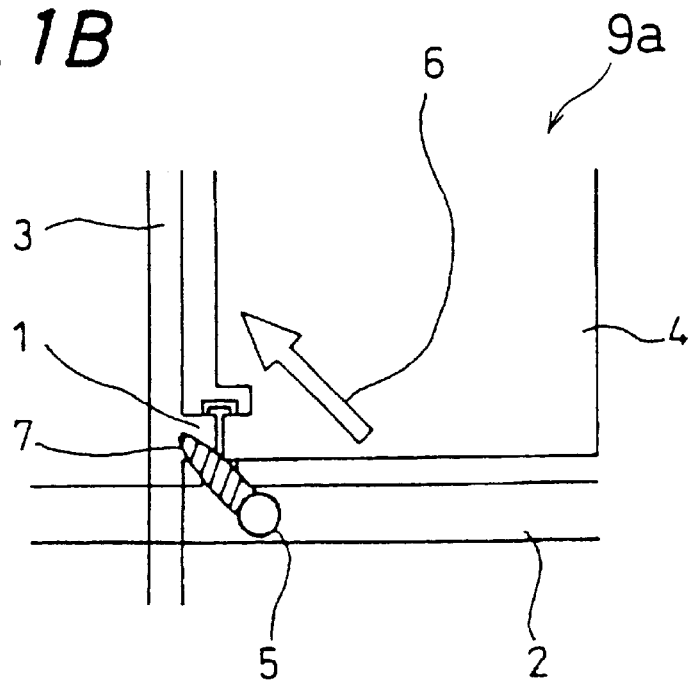

FIGS. 1A and 1B are plan views showing a liquid crystal display device 9a of a first embodiment of the invention. First, as known in the art, an active matrix substrate is made by repeatedly forming a film and patterning, the active matrix substrate being provided with a switching element 1 such as a thin film transistor (TFT) arranged in a matrix, and, a gate line 2, a source line 3 and a pixel electrode 4 which are connected to the switching element 1.

Next, a photoresist resin which will become columnar spacers is applied by using a spinner onto the active matrix substrate. In this embodiment, a positive-type acrylic photoresist resin is used. Otherwise, a polyimide photoresist resin and the like can be used. Since the columnar spacers are formed outside display regions, there is no need to consider color of the resin, and it is the only requirement for selecting a main resin that the resin is hardened due to an exposure. In a case where a step of forming an orientation film is conducted prior to a step of forming columnar spacers, an exposure for patterning the columnar spacers affects the orientation film, so that only the negative-type photoresist resin can be used. However, in this embodiment, the step of forming an orientation film is conducted after the step of forming columnar spacers, so that both the positive-type and the negative-type photoresist resins can be used, and hence a range for selecting the resin is widened.

The film thickness of the photoresist resin, which is based on the applied amount of the photoresist resin, determines a height of the columnar spacers. Therefore, it is important to regulate the density of the resin and the rotation number of the spinner. In this embodiment, a liquid crystal layer is required to have a thickness of 4.5 $\mu$m and the gate line has a thickness of 0.9 $\mu$m, so that the resin is spin-coated to have a thickness of 3.6 $\mu$m. In order to achieve that, it is appropriate to spin-coat the resin for 12 seconds, wherein a spin rotates 580 times per second.

Subsequently, a shape which will become a columnar spacer 5 is patterned on the gate line 2 by exposing to ultra violet rays (refer to FIG. 1A). A position to form the columnar spacer 5 is on the gate line 2 and slightly farther from the source line 3 than the switching element 1. After that, the unnecessary resin is removed by using a developer and the active matrix substrate is baked, whereby the columnar spacer 5 formed by the resin is hardened.

A volatilization speed of a solvent of the resin and a hardening speed of the resin can be adjusted by regulating a baking temperature and a baking time-length, so that a shape of a taper of the columnar spacer 5 is regulated by adjusting both the speeds to be appropriate. In this embodiment, a pre-baking is conducted at 40° C. for 40 minutes, and thereafter, a main baking is conducted at 200° C. for 67 minutes.

To the active matrix substrate on which the columnar spacer 5 is thus formed on the gate line 2, a polyimide-type resin film for an orientation film is applied by a printing method which is well-known in the art. Even when the resin film for an orientation film is applied by the printing method on the substrate which is thus provided with the protruding spacers, the spacers of the invention have a taper shape which is sufficiently smooth. Therefore, printing unevenness of the resin film for an orientation film and an orientation failure resulting from the unevenness are not observed at all around the spacers.

Subsequently, the resin film for an orientation film is baked and then rubbed. In this case, as shown by an arrow in FIG. 1B, a direction from the columnar spacer 5 to the switching element 1 is set as a rubbing direction 6. Since a rubbing direction in a general twisted-nematic-type liquid crystal display device is a direction forming an angle of 45° with a gate line direction, the 45° direction is selected as the rubbing direction 6. In this case, an orientation-disturbed region 7 is formed at a place where a contact of pile of a rubbing cloth is weakened due to an existence of the columnar spacer 5 (refer to a shaded portion in FIG. 1B), but this orientation-disturbed region 7 does not overlap the pixel electrode 4 substantially and does not affect display, so that a degradation of a display quality is not caused. Therefore, it is not necessary to further dispose a light-shielding member, and an aperture ratio is not lowered.

In other words, the position to form the columnar spacer 5 is determined based on the rubbing direction 6 which designates the orientation of the liquid crystal. That is to say, a point where a line drawn along the 45° rubbing direction 6 so as to pass through a place of the switching element 1, intersects the gate line 2, is set as the position to form the columnar spacer 5.

Figure 2A:
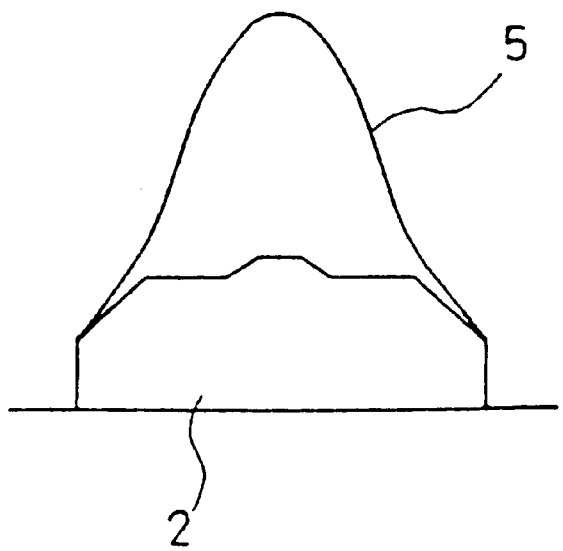
FIGS. 2A and 2B are side views showing columnar spacers 5 and 51, respectively.
Figure 2B:
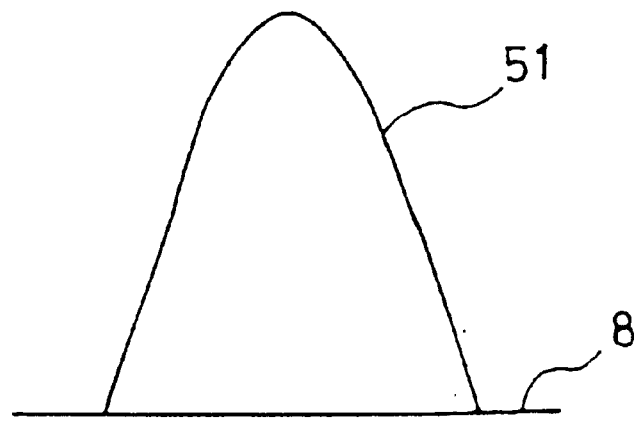

Although we are concerned that the columnar spacer 5 formed on the gate line 2 is disconnected from the active matrix substrate in the rubbing treatment or due to a use condition, and is moved to the display region, thereby degrading the display quality, such an accident does not actually happen in this embodiment. It can be understood from a comparison of FIGS. 2A and 2B that the columnar spacer 5 used in this embodiment has a larger adhesion strength to the active matrix substrate than one disposed to a flat portion of a light-shielding member of a counter substrate. FIG. 2B shows a columnar spacer 51 which is formed on a flat portion 8, whereas FIG. 2A shows the columnar spacer 5 formed on the gate line 2. The line portion usually has a taper shape at a section thereof and often has a multi-layer structure, with the result that the section of the line portion has a convex shape which has an almost smooth taper shape. In the columnar spacer of FIG. 2A, such a convex shape of the gate line 2 is reflected. As a result, it is clear that a base of the columnar spacer 5 has a larger adhesion area and the taper of the columnar spacer 5 is more gentle as compared with the columnar spacer of FIG. 2B. As illustrated in the above prior arts, since a surface shape of a light-shielding film disposed to a counter substrate is flat in general, in a case where columnar spacers are formed on the light-shielding film, it is impossible to improve the adhesion strength or to make a cone angle gentle. In this embodiment, since the base of the columnar spacer 5 has a larger adhesion area, a firm adhesion between the base and the columnar spacer is enabled.

After the rubbing step, in the same manner as a general method for manufacturing a liquid crystal display device, the active matrix substrate and the counter substrate are bonded together via a seal portion which is disposed at the perimeter of a display portion and is used for holding a cell thickness, the seal portion being made of an epoxy adhesion into which glass fiber is mixed. Then, liquid crystal is sealed into a space between the active matrix substrate and the counter substrate, whereby a liquid crystal display device 9a is completed.

Other than the above-shown position, the columnar spacer 5 may be patterned at positions as shown in FIGS. 3A through 7B. In these drawings, numerical reference 1 denotes a switching element such as a thin film transistor, 2 denotes a gate line, 3 denotes a source line, 4 denotes a pixel electrode, 5 denotes a columnar spacer, 6 denotes a rubbing direction and 7 denotes an orientation-disturbed region.

Figure 3A:
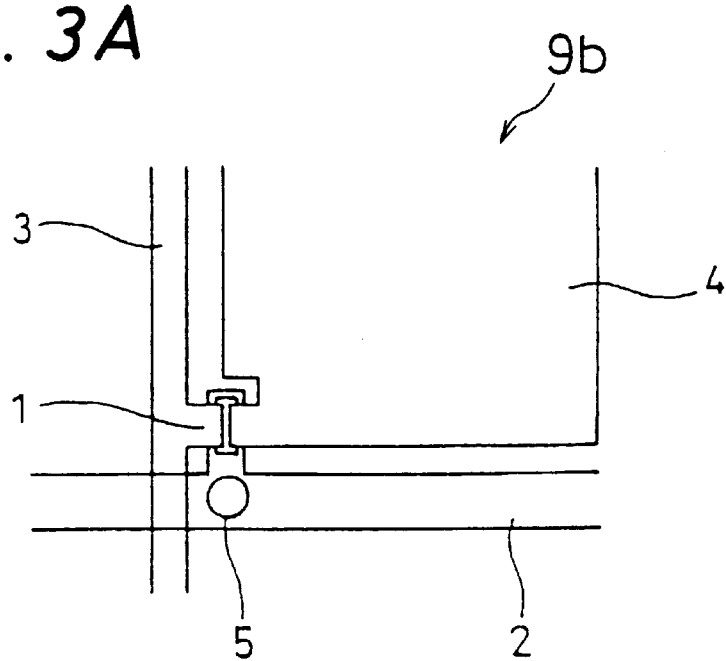
FIGS. 3A and 3B are plan views showing a liquid crystal display device 9b of a second embodiment of the invention.
Figure 3B:
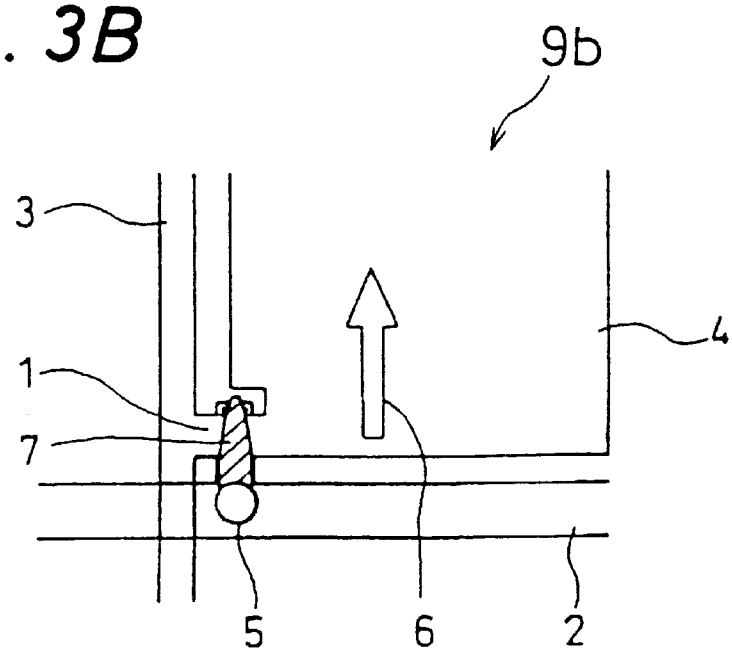

A liquid crystal display device 9b of FIGS. 3A and 3B is formed as follows. As shown in FIG. 3A, the columnar spacer 5 is formed on the gate line 2 at a position corresponding to a gate of the switching element 1, and thereafter, a resin film for an orientation film is formed on the active matrix substrate, and as shown in FIG. 3, a rubbing treatment is given to the resin film for an orientation film in the rubbing direction 6 which is parallel to the source line 3 and directs from the columnar spacer 5 to the switching element 1, as shown by an arrow. Downstream from the columnar spacer 5 in the rubbing direction 6, the orientation-disturbed region 7 is formed, but this orientation-disturbed region 7 overlaps the switching element 1 and does not substantially overlap the pixel electrode 4 at all. Since the region does not affect display, a degradation of the display quality is not caused.

Figure 4A:
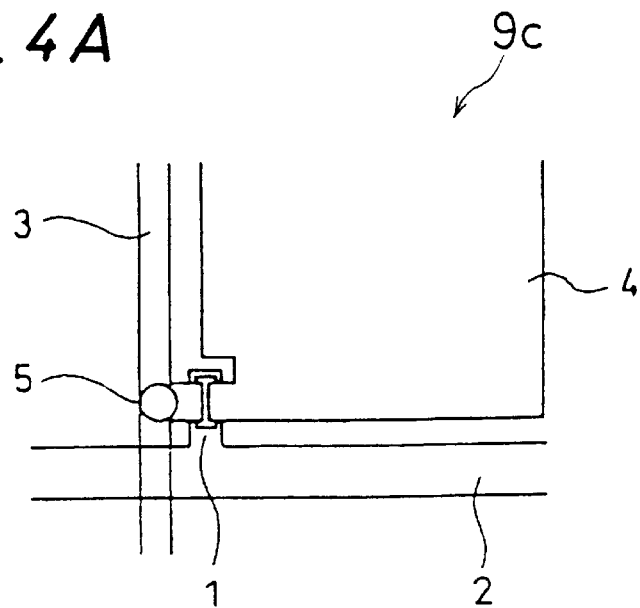
FIGS. 4A and 4B are plan views showing a liquid crystal display device 9c of a third embodiment of the invention.
Figure 4B:
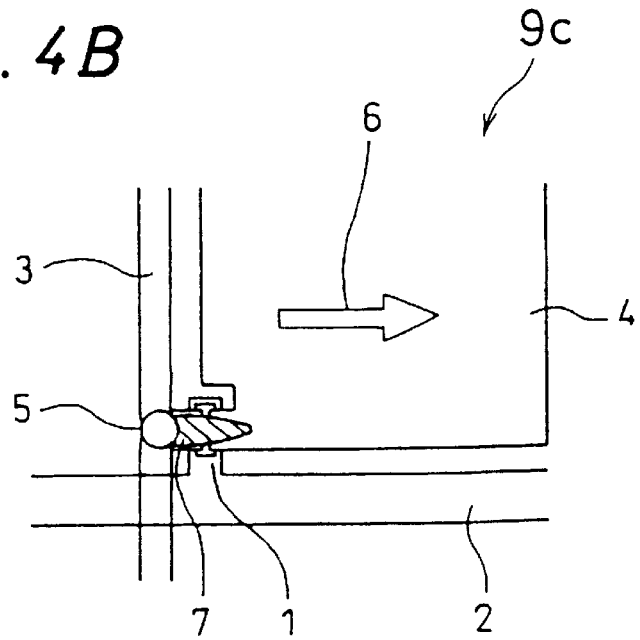

A liquid crystal display device 9c of FIGS. 4A and 4B is formed as follows. As shown in FIG. 4A, the columnar spacer 5 is formed on the source line 3 at a position corresponding to a source of the switching element 1, and thereafter, a resin film for an orientation film is formed on the active matrix substrate, and as shown in FIG. 4B, a rubbing treatment is given to the resin film for an orientation film in the rubbing direction 6 which is parallel to the gate line 2 and is from the columnar spacer 5 to the switching element 1, as shown by an arrow. Although the orientation-disturbed region 7 is formed downstream from the columnar spacer 5 in the rubbing direction 6, this orientation-disturbed region 7 overlaps the switching element 1 without overlapping the pixel electrode 4 substantially and does not affect display, so that a degradation of the display quality is not caused.

FIGS. 5A through 7B show a case where the columnar spacer 5 is formed on the switching element 1. In the case of a liquid crystal display device 9d of FIGS. 5A and 5B, as known in the art, the active matrix substrate which is provided with the switching element 1 arranged in a matrix, and the gate line 2, source line 3 and pixel electrode 4 connected to this switching element 1, is firstly made by repeatedly film-forming and pattering.

Next, a photoresist resin which will become the columnar spacers is applied by using a spinner onto the active matrix substrate. Also in this embodiment, a positive-type acrylic photoresist resin is used. The height of the columnar spacer 5 is determined based on the applied amount, that is, the film thickness of the photoresist resin. In this embodiment, the thickness of the liquid crystal layer needs to be 4.5 $\mu$m and that of the switching element 1 is 1.6 $\mu$m, so that the resin is spin-coated so as to have a thickness of 2.9 $\mu$m. In order to achieve that, it is appropriate to spin-coat the resin for 12 seconds, wherein a spin rotates 640 times per second.

Figure 5A:
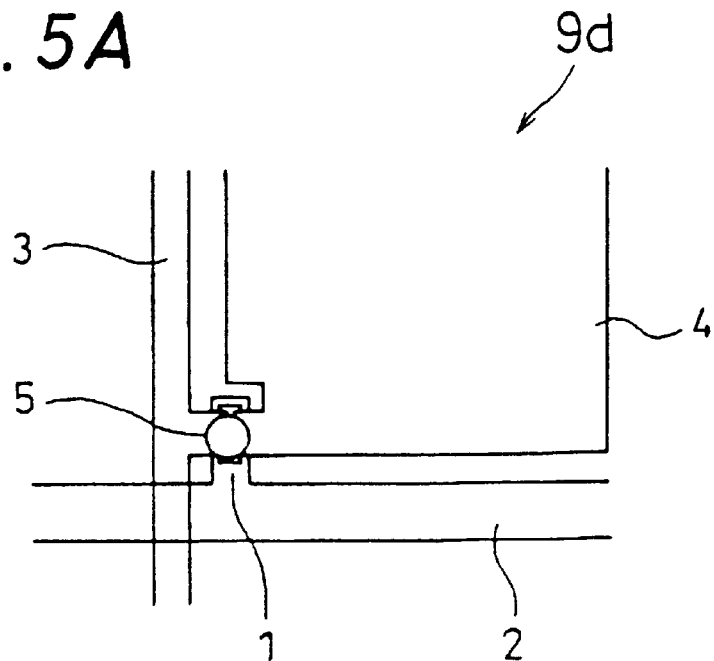
FIGS. 5A and 5B are plan views showing a liquid crystal display device 9d of a fourth embodiment of the invention.
Figure 5B:
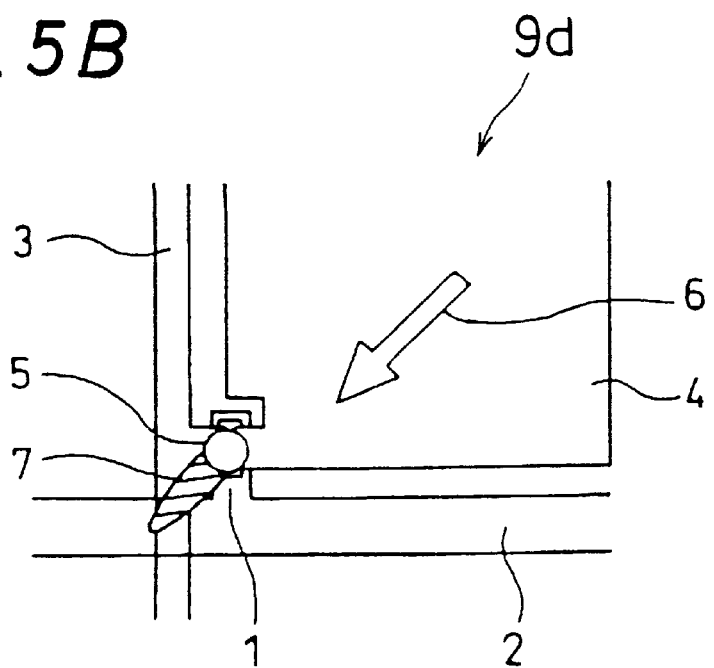

Subsequently, a shape which will become the columnar spacer 5 is patterned on the switching element 1 by an exposure to ultra violet rays (refer to FIG. 5A). After that, the unnecessary resin is removed by using a developer and the active matrix substrate is baked, whereby the columnar spacer 5 formed by the resin is hardened. A volatilization speed of a solvent of the resin and a hardening speed of the resin can be adjusted by regulating a baking temperature and a baking time-length, so that a taper shape of the columnar spacer 5 is regulated by adjusting both the speeds to be appropriate. In this embodiment, a pre-baking is conducted at 40° C. for 10 minutes, and thereafter, a main baking is conducted at 200° C. for 67 minutes.

To the active matrix substrate on which the columnar spacer 5 is thus formed on the gate line 2, a polyimide-type resin film for an orientation film is applied by a printing method which is well-known in the art. The resin film for an orientation film is baked at 180° C. and then rubbed. In this case, as shown by an arrow in FIG. 5B, a rubbing treatment is given in the rubbing direction 6 which forms an angle of 45° with the gate line 2 and with the source line 3, and which directs from the columnar spacer 5 to an intersection of the gate line 2 and the source line 3. This 45° direction is, as aforementioned, a rubbing direction in a general twisted-nematic-type liquid crystal display device. The orientation-disturbed region 7 is formed at a place where a contact of pile of a rubbing cloth is weakened due to an existence of the columnar spacer 5, but this orientation-disturbed region 7 overlaps the gate line 2 and the source line 3 without overlapping the pixel electrode 4 substantially and does not affect display, so that a degradation of the display quality is not caused. Therefore, it is not necessary to further dispose a light-shielding member, and an aperture ratio is not lowered.

Figure 6A:
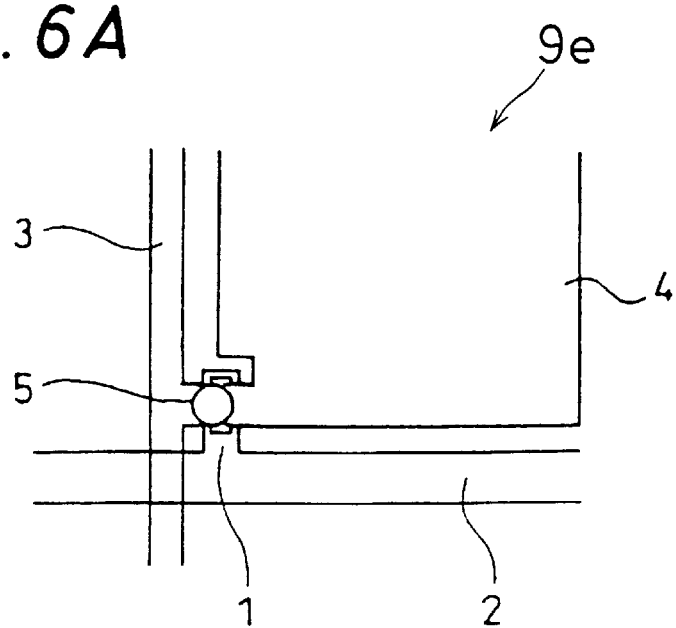
FIGS. 6A and 6B are plan views showing a liquid crystal display device 9e of a fifth embodiment of the invention.
Figure 6B:
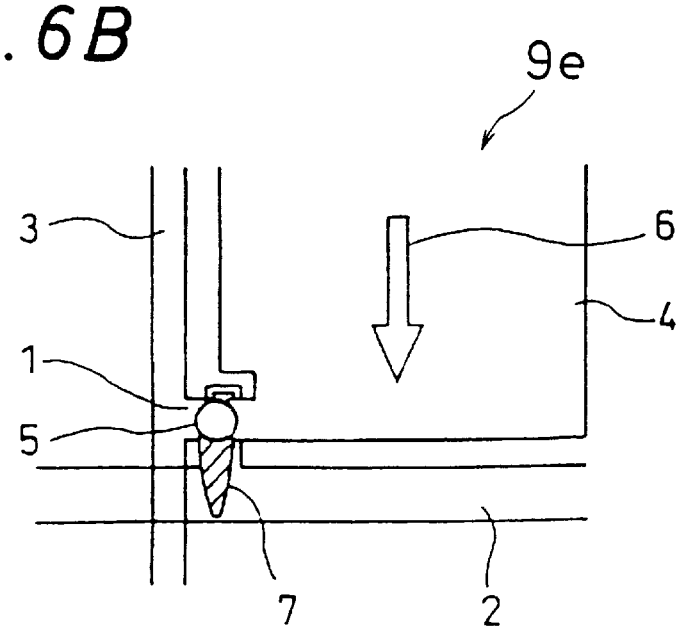

A liquid crystal display device 9e of FIGS. 6A and 6B is formed as follows. As shown in FIG. 6A, the columnar spacer 5 is formed on the switching element 1, and thereafter, a resin film for an orientation film is formed on the active matrix substrate, and as shown in FIG. 6B, a rubbing treatment is given to the resin film for an orientation film in the rubbing direction 6 which is parallel to the source line 3 and directs from the columnar spacer 5 to the gate line 2, as shown by an arrow. Although the orientation-disturbed region 7 is formed downstream from the columnar spacer 5 in the rubbing direction 6, this orientation-disturbed region 7 overlaps the gate line 2 without overlapping the pixel electrode 4 substantially, and does not affect display, so that a degradation of the display quality is not caused.

Figure 7A:
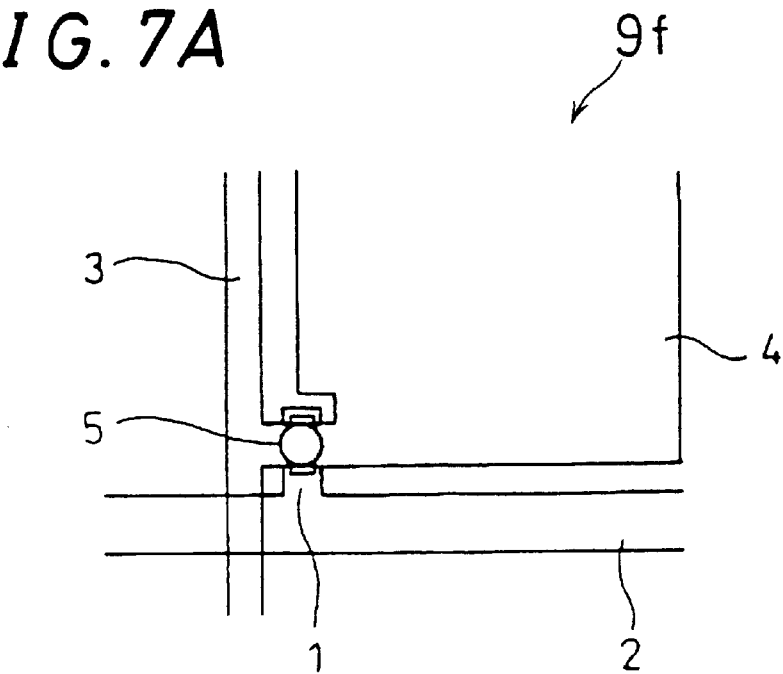
FIGS. 7A and 7B are plan views showing a liquid crystal display device 9f of a sixth embodiment of the invention.
Figure 7B:
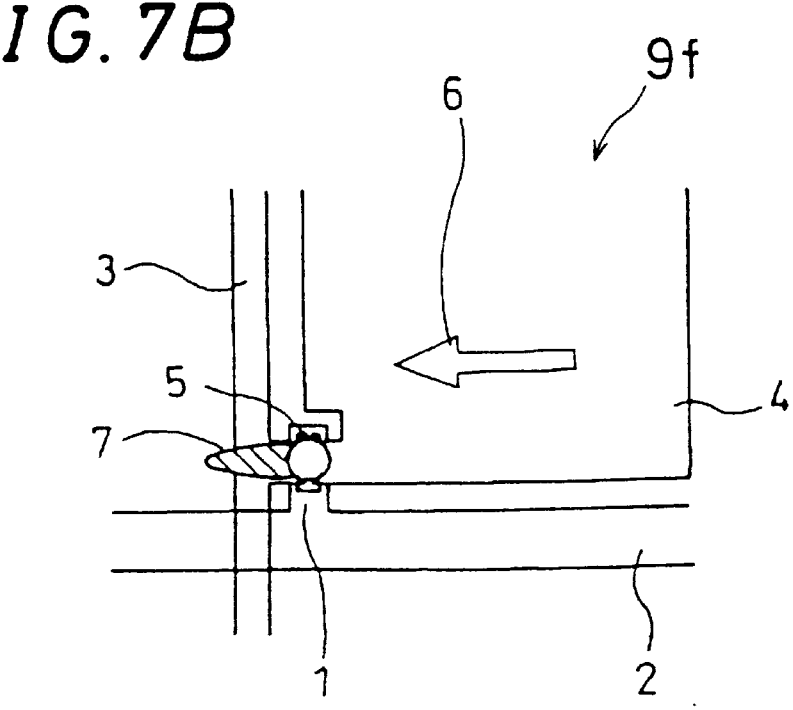

A liquid crystal display device 9f of FIGS. 7A and 7B is formed as follows. As shown in FIG. 7A, the columnar spacer 5 is formed on the switching element 1, and thereafter, a resin film for an orientation film is formed on the active matrix substrate, and as shown in FIG. 7B, a rubbing treatment is given to the resin film for an orientation film in the rubbing direction 6 which is parallel to the gate line 2 and directs from the columnar spacer 5 to the source line 3, as shown by an arrow. Although the orientation-disturbed region 7 is formed downstream from the columnar spacer 5 in the rubbing direction 6, this orientation-disturbed region 7 overlaps the source line 3 without overlapping the pixel electrode 4 substantially and does not affect display, so that a degradation of the display quality is not caused.

Otherwise, the columnar spacers may be disposed at positions as shown in FIGS. 8A through 11B.

Figure 8A:
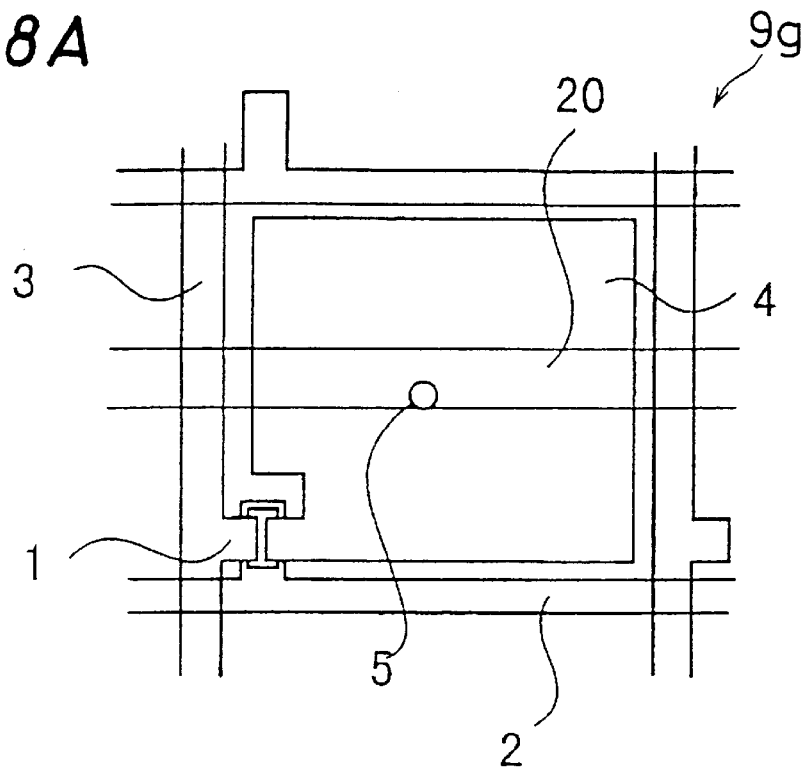
FIGS. 8A and 8B are plan views showing a liquid crystal display device 9g of a seventh embodiment of the invention.
Figure 8B:
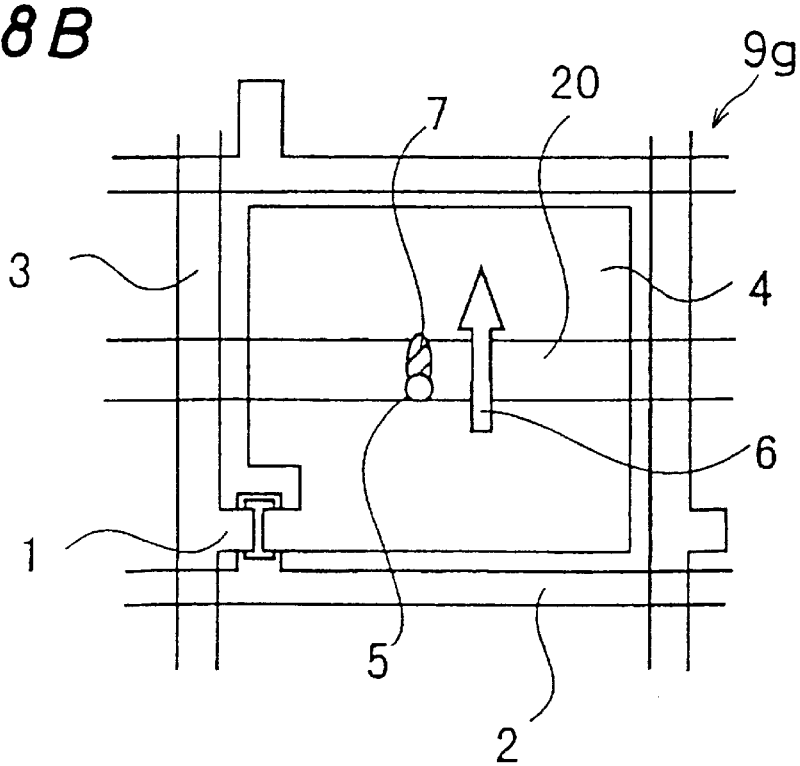

A liquid crystal display device 9g of FIGS. 8A and 8B is formed as follows. As shown in FIG. 8A, the columnar spacer 5 is formed on a portion which is on an auxiliary capacity line 20 formed in the same step with the gate line 2, and thereafter, a resin film for an orientation film is formed on the active matrix substrate, and as shown in FIG. 8B, a rubbing treatment is given to the resin film for an orientation film in the rubbing direction 6 which is parallel to the source line 3 and directs from the columnar spacer 5 to the gate line 2, as shown by an arrow. Although the orientation-disturbed region 7 is formed downstream in the rubbing direction 6 due to the rubbing treatment, this orientation-disturbed region 7 overlaps the auxiliary capacity line 20 and does not affect display, so that a degradation of the display quality is not caused.

Figure 9A:
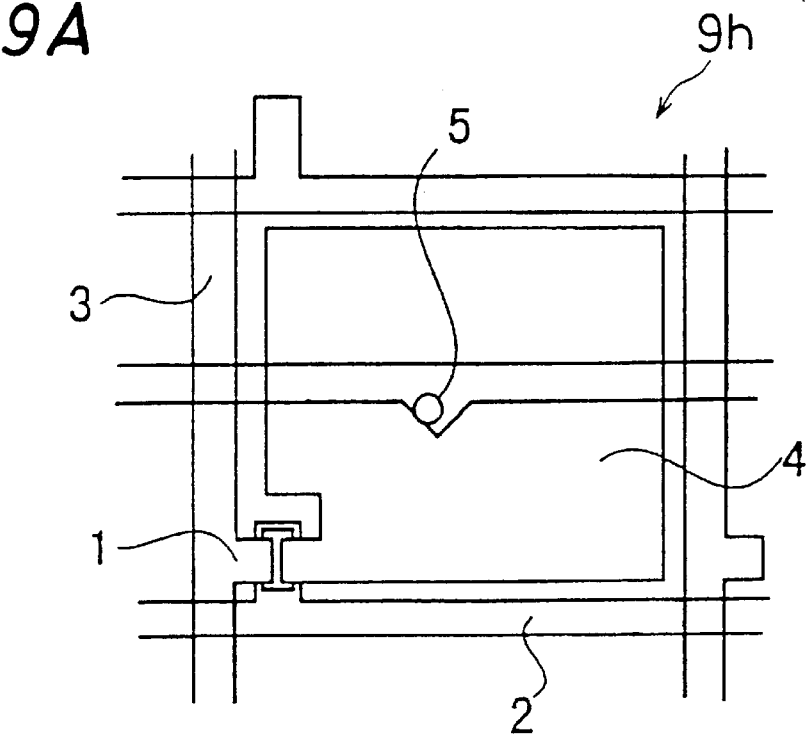
FIGS. 9A and 9B are plan views showing a liquid crystal display device 9h of an eighth embodiment of the invention.
Figure 9B:
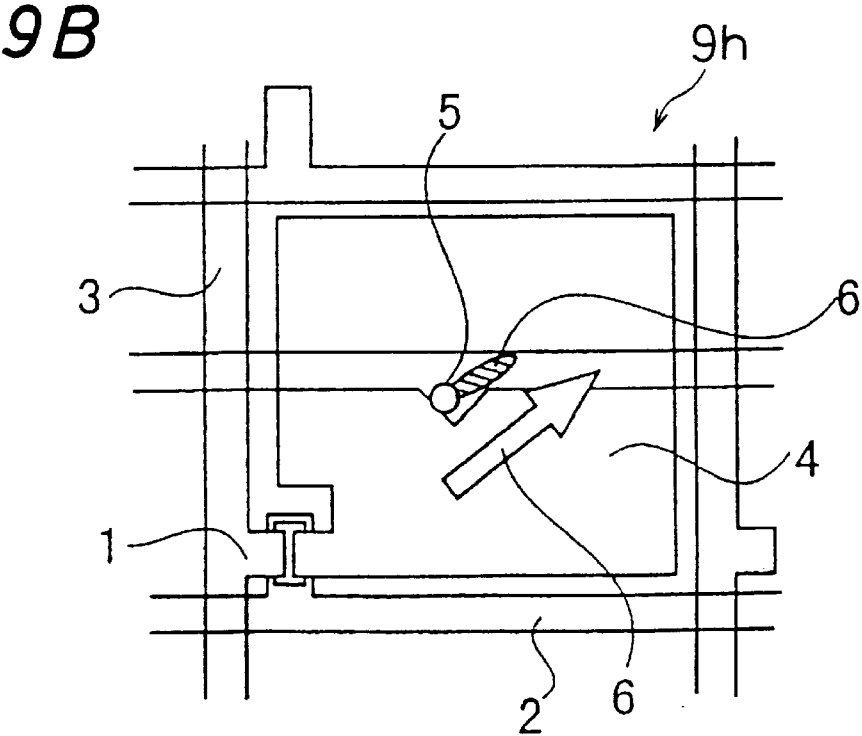

Although a liquid crystal display device 9h of FIGS. 9A and 9B is also formed on the auxiliary capacity line 20, the shape of the auxiliary capacity line 20 of FIG. 9A is different from that of FIGS. 8A and 8B. In other words, the line is deformed so that a portion to form the columnar spacer 5 is broader than other portions. After the columnar spacer 5 is formed at a portion which is on the auxiliary capacity line 20, a resin film for an orientation film is formed on the active matrix substrate, and as shown in FIG. 9B, a rubbing treatment is given to the resin film for an orientation film in a direction from the columnar spacer 5 provided at an edge portion of the deformed portion of the auxiliary capacity line 20 to an edge portion which is opposite thereto and the farthest therefrom, as shown by an arrow. Although the orientation-disturbed region 7 is formed downstream in the rubbing direction 6 due to the rubbing treatment, it is possible to cause this orientation-disturbed region 7 to overlap the auxiliary capacity line 20 by partially changing the width of the auxiliary capacity line 20, and the region does not affect display, so that a degradation of the display quality is not caused. Furthermore, since the shape of the auxiliary capacity line 20 is deformed only at a portion corresponding to the columnar spacer 5 and the orientation-disturbed region 7, it can be prevented that a pixel aperture ratio is largely lowered. In the liquid crystal display device 9h, a pattern is changed at a degree where the display quality and electric characteristics are not affected.

Figure 10A:
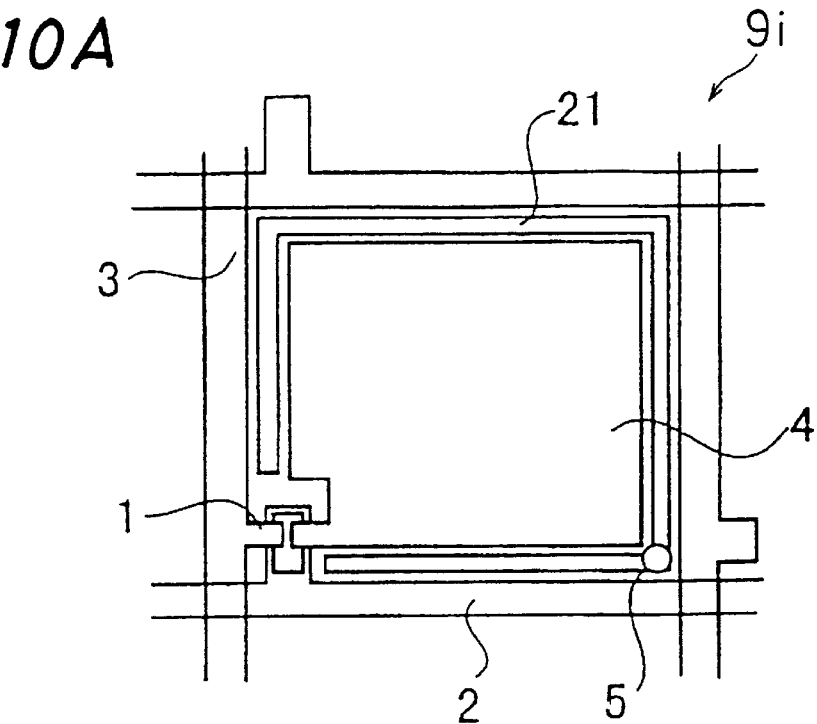
FIGS. 10A and 10B are plan views showing a liquid crystal display device 9i of a ninth embodiment of the invention.
Figure 10B:
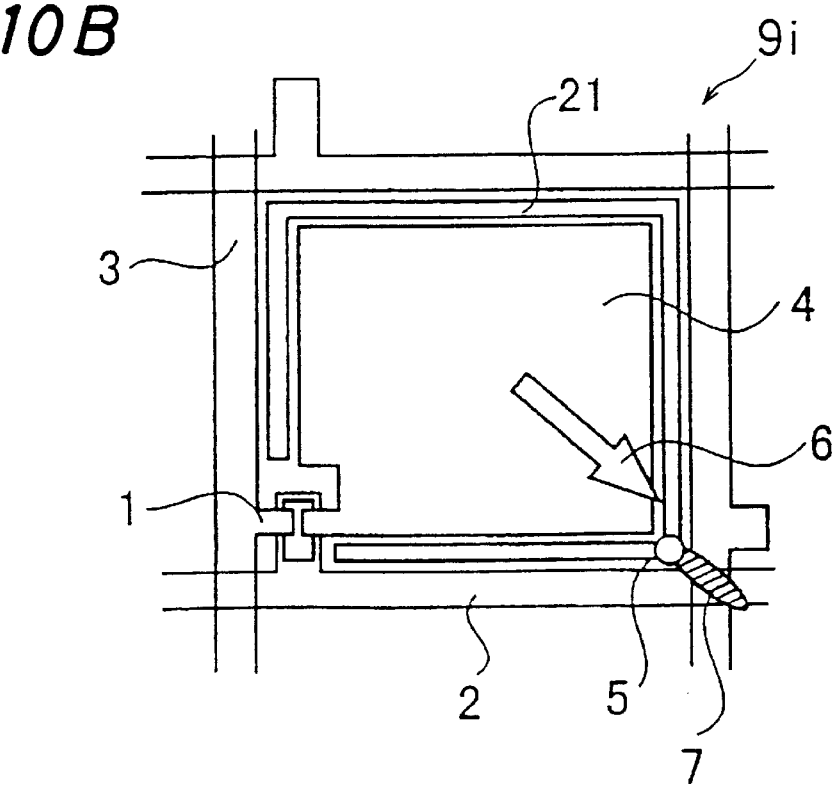

A liquid crystal display device 9i of FIGS. 10A and 10B is formed as follows. As shown in FIG. 10A, the columnar spacer 5 is formed on a pattern-removed portion 21 of an insulating film (gate insulating film or interlayer insulating film) which is disposed to prevent leakage between the gate line 2 or source line 3 and the pixel electrode 4. In FIGS. 10A and 10B, for example, the columnar spacer 5 is formed in the vicinity of an intersection of the gate line 2 and the source line 3 and on a corner portion of the pattern-removed portion 21 which is parallel to the gate line 2 and the source line 3. When the columnar spacer 5 is formed on the pattern-removed portion 21, whose sectional shape is almost concave, the columnar spacer 5 also has a smooth taper in accordance with a taper shape of the pattern-removed portion 21 and the adhesion strength of the columnar spacer 5 becomes firm. After such a columnar spacer 5 is formed, a resin film for an orientation film is formed on the active matrix substrate, and as shown in FIG. 10B, a rubbing treatment is given to the resin film for an orientation film in a direction from the columnar spacer on the pattern-removed portion 21 to the intersection of the gate line 2 and the source line 3, as shown by an arrow. Although the orientation-disturbed region 7 is formed downstream in the rubbing direction 6 due to the rubbing treatment, this orientation-disturbed region 7 overlaps the gate line 2 and source line 3 without overlapping the pixel electrode 4 substantially and does not affect display, so that a degradation of the display quality is not caused.

Figure 11A:
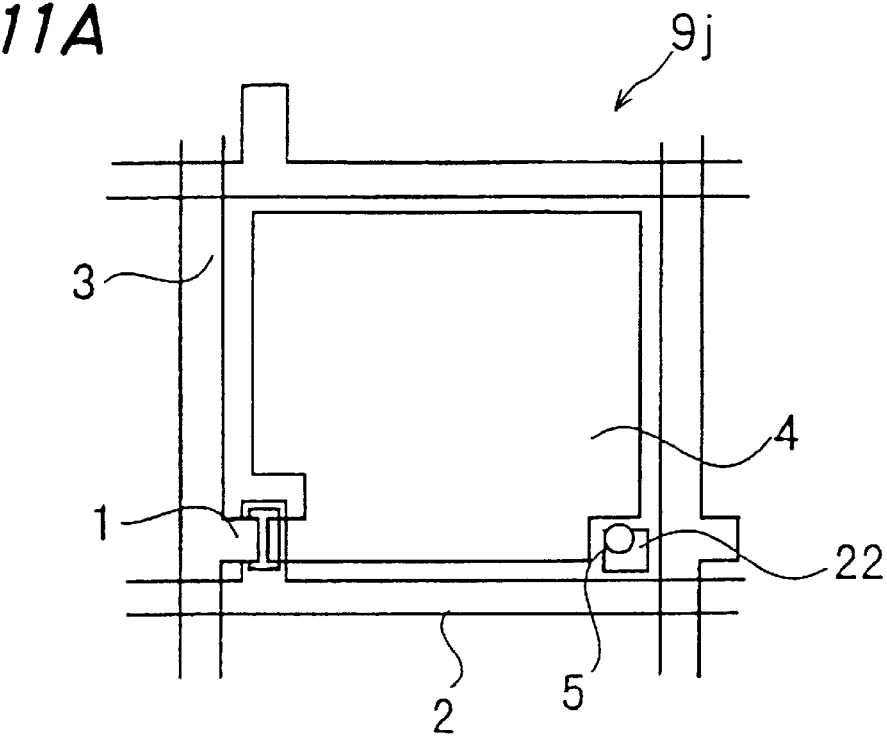
FIGS. 11A and 11B are plan views showing a liquid crystal display device 9j of a tenth embodiment of the invention.
Figure 11B:
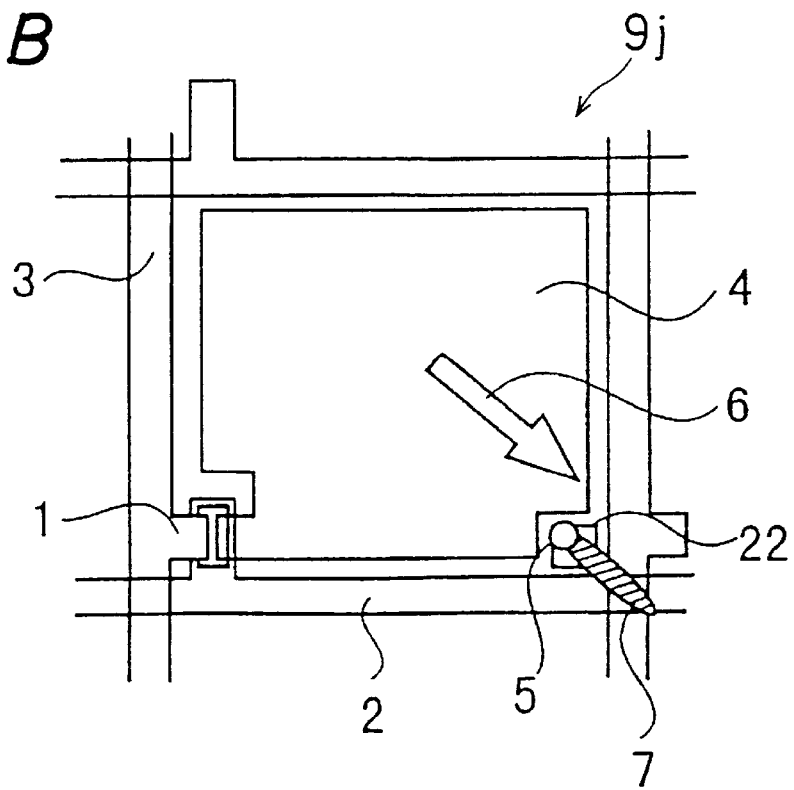

A liquid crystal display device 9j of FIGS. 11A and 11B is formed as follows. As shown in FIG. 11A, the columnar spacer 5 is formed on a dummy pattern 22 which is formed at the same time with the step of forming the gate line 2 and the source line 3. After such a columnar spacer 5 is formed, a resin film for an orientation film is formed on the active matrix substrate, and as shown in FIG. 11B, a rubbing treatment is given to the resin film for an orientation film in a direction as shown by an arrow. Although the orientation-disturbed region 7 is formed downstream in the rubbing direction 6 due to the rubbing treatment, this orientation-disturbed region 7 overlaps the gate line 2 and source line 3 without overlapping the pixel electrode 4 substantially and does not affect display, so that a degradation of the display quality is not caused. In the liquid crystal display device 9j, a pattern is changed at a degree where the display quality and electric characteristics are not affected.

The position of the columnar spacer 5 and the rubbing direction 6 are not restricted to ones shown in FIGS. 3A through 11B. Further, the shape of the pattern-removed portion 21 and the dummy pattern 22 is not restricted to one shown in FIGS. 3A through 11B.

Any of the columnar spacers 5 shown in FIGS. 3A through 11B, that is, any of the spacers formed on the gate line 2 or the source line 3, on the switching element 1, on the auxiliary capacity line 20, on the pattern-removed portion 21, and on the dummy patter 22, is not disconnected from the active matrix substrate in the rubbing step. For instance, the switching element 1 generally has a taper shape at a section thereof and often has a multi-layer structure, with the result that the section of the switching element portion has a complicated irregularity. An adhesion area thereof is increased due to this shape, and hence the columnar spacer disposed thereto has a larger adhesion strength than a columnar spacer disposed on a flat portion. The gate line 2, the source line 3, the auxiliary capacity line 20, and the dummy pattern 22 using them have an irregularity on the surface thereof and often have a section which is an almost taper shape, so that the adhesion area thereof is increased due to this shape, and the columnar spacer has a larger adhesion strength than a columnar spacer disposed on a flat portion. Further, even when the columnar spacer is disposed on the pattern-removed portion 21 of the insulating film or the like, from which portion a pattern is partially removed, an adhesion area is increased and an adhesion strength is larger than the columnar spacer is disposed on a flat portion. In any case, when the spacer has a taper shape at least at a portion corresponding to an upstream of the rubbing direction, it is possible to decrease a defection that the spacer is disconnected in the rubbing direction.

After the rubbing step, in the same manner as a method for manufacturing a general liquid crystal display device, the active matrix substrate and the counter substrate are bonded together via a seal portion which is disposed at the perimeter of a display portion and used for maintaining a cell thickness, the seal portion being made of an epoxy adhesive into which glass fiber is mixed.

Next, embodiments in which the active matrix substrate and the counter substrate are bonded together also at vertexes of columnar spacers will be explained.

Figure 12A:
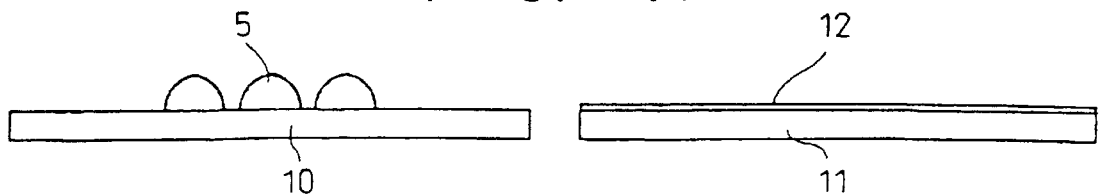
FIGS. 12A through 12E are side views showing a method for manufacturing a liquid crystal display device 9k of the invention.
Figure 12B:
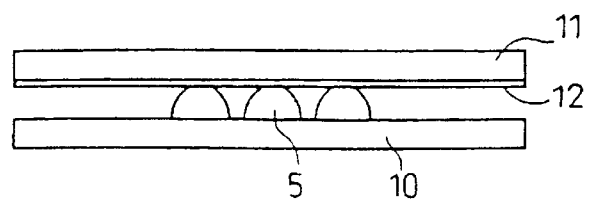
Figure 12C:
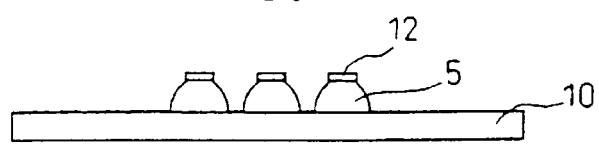

As shown in FIG. 12A, an active matrix substrate 10 to which the columnar spacers 5 are disposed and a rubbing treatment is given, and a glass 11 to which an adhesive 12 is applied, are prepared. As the active matrix substrate 10, any one shown in FIGS. 1A, 1B, and 3A through 11B may be used. In FIGS. 12A through 12E, the columnar spacers 5 are largely drawn for emphasis in order to make it easier to understand (as a result, a space between adjacent columnar spacers 5 is extremely narrowed). As the adhesive 12, one which is made by dissolving a double-fluid-type epoxy adhesive in butyl cellosolve, is prepared. The dissolved adhesive 12 is applied by a spin-cast method to the glass 11 having the same size with the active matrix substrate 10. Subsequently, as shown in FIG. 12B, the glass 11 is overlaid on the active matrix substrate 10 in a state where a face to which the adhesive 12 is applied, and a face to which the columnar spacers 5 are disposed, face to each other, and then the glass 11 is removed. As a result, as shown in FIG. 12C, the adhesive 12 is transferred onto the vertexes of the respective columnar spacers 5.

Figure 12D:
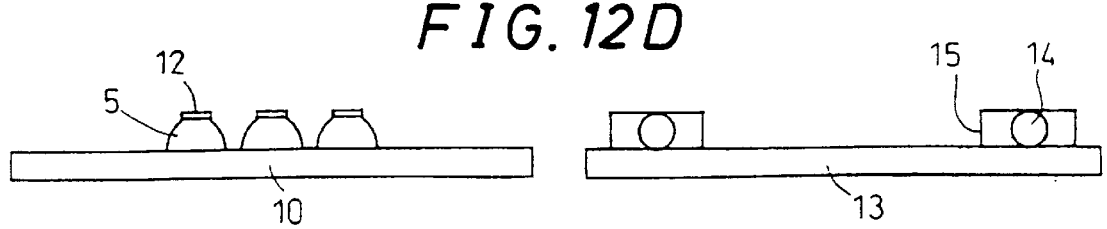
Figure 12E:
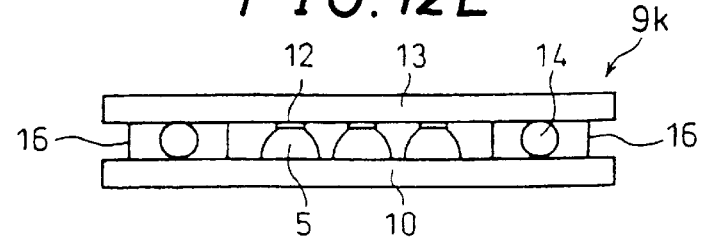

On the other hand, as shown in FIG. 12D, to the perimeter of a transparent counter substrate 13 which has a transparent counter electrode, an epoxy adhesive 15 for maintaining a cell thickness is applied by a screen printing method, into which adhesive 15 glass fiber 14 is mixed. Then, as shown in FIG. 12E, the active matrix substrate 10 on which the adhesive 12 is transferred onto the vertexes of the columnar spacers 5, and the counter substrate 13, to the perimeter of which the adhesive 15 is applied, are bonded together, the adhesive 15 is hardened by heating so as to be a seal portion 16 into which glass fiber is mixed, and the active matrix 10 and the counter substrate 13 are adhered to each other at this seal portion 16. At this time, the respective columnar spacers 5 are adhered to the counter substrate 13 via the adhesive 12 of the vertexes of the respective columnar spacers 5. Subsequently, liquid crystal is sealed into a space between the active matrix substrate 10 and the counter substrate 13, whereby a liquid crystal display device 9k is completed.

In the liquid crystal display device 9k thus manufactured, the vertexes of the columnar spacers 5 are adhered via the adhesive 12, so that the active matrix substrate 10 and the counter substrate 13 are more firmly adhered to each other, as compared with a general liquid crystal display device in which an active matrix substrate and a counter substrate are bonded together only at a seal portion of the perimeter. As a result, the thickness of the liquid crystal layer becomes uniform and display unevenness is eliminated, whereby the display quality is improved. Further, the yield is improved.

Figure 13A:
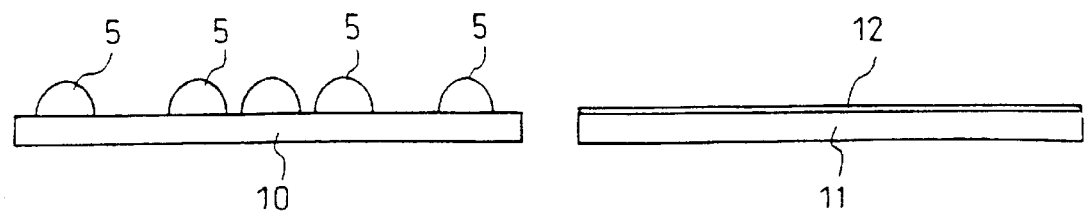
FIGS. 13A through 13E are side views showing another method for manufacturing a liquid crystal display device 9m of the invention.
Figure 13B:
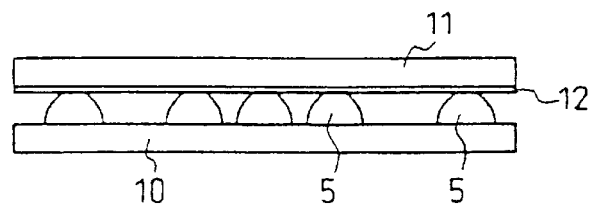
Figure 13C:
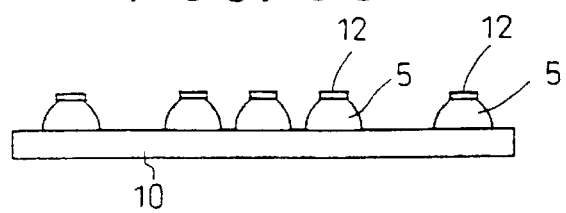

There is another embodiment as described below. As shown in FIG. 13A, the active matrix substrate 10 to which the columnar spacers 5 are provided one by one for each pixel electrode 4 as well as at a position corresponding to the seal portion 18 (refer to FIG. 13E) and to which a rubbing treatment is given, and the glass 11 to which the adhesive 12 is applied, are prepared. As the active matrix substrate 10, any one shown in FIGS. 1A, 1B, and 3A through 11B may be used. Subsequently, as shown in FIG. 13B, the glass 11 is overlaid on the active matrix substrate 10 and then the glass 11 is removed, with the result that, as shown in FIG. 13C, the adhesive 12 is transferred onto the vertexes of the respective columnar spacers 5 including the spacers of the perimeter.

Figure 13D:
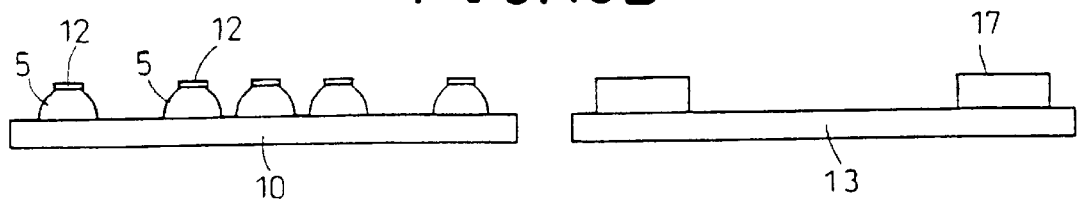
Figure 13E:
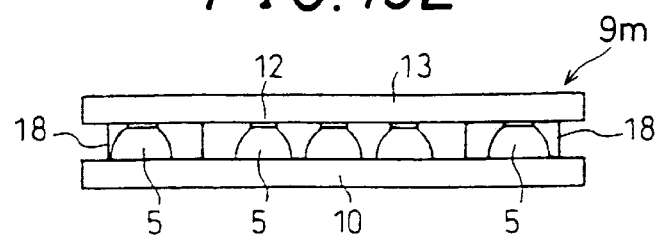

On the other hand, as shown in FIG. 13D, to the perimeter of the transparent counter substrate 13 which has a transparent counter electrode, an epoxy adhesive 17 is applied by the screen printing method. In this adhesive 17, glass fiber 14 is not mixed. Then, as shown in FIG. 13E, the active matrix substrate 10 on which the adhesive 12 is transferred onto the vertexes of the respective columnar spacers 5 including spacers of the perimeter as mentioned above, and the counter substrate 13, to the perimeter of which the adhesive 17 is applied, are bonded together, the adhesive 17 is hardened by heating so as to be a seal portion 18, and the active matrix 10 and the counter substrate 13 are adhered to each other at this seal portion 18. At this time, the respective columnar spacers 5 are adhered to the counter substrate 13 via the adhesive 12 of the vertexes of the respective columnar spacers 5. Further, the columnar spacer 5 of the perimeter are incorporated in the seal portion 18. Subsequently, liquid crystal is sealed into a space between the active matrix substrate 10 and the counter substrate 13, whereby a liquid crystal display device 9m is completed.

As compared with a general liquid crystal display device in which an active matrix substrate and a counter substrate are bonded together only at a seal portion of the perimeter, in the liquid crystal display device 9m thus manufactured, the vertexes of the columnar spacers 5 are adhered via the adhesive 12, and moreover, the columnar spacers 5 exist in the seal portion 18 of the perimeter, so that a space between the active matrix substrate and the counter substrate 13 is regulated. As a result, the thickness of the liquid crystal layer becomes uniform and display unevenness is eliminated, whereby the display quality is more improved and the yield is more enhanced.

In the respective embodiments as shown above, the columnar spacer 5 is placed on the gate line 2, the source line 3 or the switching element 1, but the invention is not restricted to them. The columnar spacer 5 may be disposed on a common line serving as a line of a storage condenser which is connected to a drain electrode of the switching element 1 so as to be parallel to the pixel electrode 4. Also in this case, the rubbing direction 6 is set so that the orientation-disturbed region 7 does not overlap the pixel electrode 4, which region 7 is formed downstream from the columnar spacer 5 in the rubbing direction due to the rubbing treatment to a resin film for an orientation film.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:
   a liquid crystal layer, and an active matrix substrate and a counter substrate for interposing the liquid crystal layer therebetween, the active matrix substrate having at least switching elements and pixel electrodes arranged in matrix form;
   columnar spacers for regulating a space between the substrates, which spacers are attached to respective portions of a liquid-crystal-layer-side surface of the active matrix substrate, the portions having irregularities and an at least partially tapered cross-section;
   wherein the columnar spacers have a taper angle in accordance with the at least partially tapered shape of the portions of the liquid-crystal-layer-side surface of the active matrix substrate; and
   wherein each of a plurality of said spacers is located in accordance with rubbing or orientation direction on one of said substrates, wherein respective orientation-disturbed regions adjacent to respective spacers do not substantially overlap one or more pixel electrodes.

2. The liquid crystal display device of claim 1,
wherein the active matrix substrate further has lines connected to the switching elements, on the liquid-crystal-layer side; and the columnar spacers are disposed on the lines in vicinities of the switching elements.

3. The liquid crystal display device of claim 1, wherein the columnar spacers are disposed on the switching elements.

4. The liquid crystal display device of claim 2, further comprising an orientation film which is formed on a liquid-crystal-layer-side surface of the active matrix substrate, wherein a surface of said orientation film includes an orientation or rubbing direction provided in a direction from the columnar spacer toward the switching element.

5. The liquid crystal display device of claim 4, wherein the rubbing or orientation direction is selected so that orientation-disturbed regions do not substantially overlap the pixel electrodes, which regions are formed in vicinities of the columnar spacers on the orientation film in a direction from the columnar spacers toward the rubbing direction.

6. The liquid crystal display device of claim 1, further comprising an adhesion layer for adhering vertexes of the columnar spacers to the counter substrate.

7. The liquid crystal display device of claim 1, further comprising a seal portion for bonding the active matrix substrate and the counter electrode together at a perimeter of the substrates, wherein the columnar spacers are disposed on the active matrix substrate facing the seal portion.

8. A liquid crystal display comprising:
a first substrate including a plurality of address lines and a plurality of switching elements thereon;
a second substrate;
a liquid crystal layer disposed between said first and second substrates;
a plurality of spacers provided between said first and second substrates for regulating a space between the first and second substrates;
each of said first and second substrates including a rubbing or orientation film including respective rubbing or orientation directions; and wherein each of a plurality of said spacers is located in accordance with the orientation or rubbing direction of at least one of said substrates, so that respective orientation-disturbed regions adjacent to respective spacers do not substantially overlap one or more pixel electrodes.

9. The liquid crystal display of claim 8, wherein said orientation-disturbed regions are located adjacent to respective spacers so that said orientation-disturbed regions extend from said respective spacers along a direction of orientation or rubbing.

10. The liquid crystal display of claim 8, wherein a plurality of said spacers are attached to conductive address lines of said first substrate, and wherein respective upper surfaces of said address lines include an at least partially tapered cross-sectional shape.

11. The liquid crystal display of claim 8, wherein a plurality of said spacers are located on respective switching elements.

12. A liquid crystal display comprising:
a liquid crystal layer disposed between first and second substrates, said first substrate including a plurality of conductive address lines disposed thereon;
an orientation layer defining an orientation or alignment direction provided on said first substrate;
a plurality of spacers provided between said first and second substrates at respective locations on said conductive address lines, wherein said spacers are located relative to said orientation or alignment direction so that orientation-disturbed regions adjacent respective ones of said spacers extend in a direction of said orientation or alignment direction and a plurality of said orientation-disturbed regions do not substantially overlap one or more pixel electrodes.

* * * * *